(12) United States Patent
Brittingham et al.

(10) Patent No.: US 7,976,280 B2
(45) Date of Patent: Jul. 12, 2011

(54) TURBINE BUCKET SHROUD INTERNAL CORE PROFILE

(75) Inventors: Robert Alan Brittingham, Piedmont, SC (US); Linda Jean Farral, Greenville, SC (US); James Zhang, Simpsonville, SC (US); Charles Malinowski, Mauldin, SC (US)

(73) Assignee: General Electric Company, Schenectady, NY (US)

( * ) Notice: Subject to any disclaimer, the term of this patent is extended or adjusted under 35 U.S.C. 154(b) by 1086 days.

(21) Appl. No.: 11/987,163

(22) Filed: Nov. 28, 2007

(65) Prior Publication Data

US 2009/0136347 A1    May 28, 2009

(51) Int. Cl.
*F01D 5/22* (2006.01)
*F01D 5/14* (2006.01)

(52) U.S. Cl. ............... 416/189; 416/191; 416/223 R; 416/232

(58) Field of Classification Search ............ 416/189, 416/191, 223 R, 232
See application file for complete search history.

(56) References Cited

U.S. PATENT DOCUMENTS

| | | | |
|---|---|---|---|
| 5,980,209 A | 11/1999 | Barry et al. | |
| 6,471,480 B1 | 10/2002 | Balcum, III | |
| 6,722,851 B1 | 4/2004 | Brittingham et al. | |
| 6,761,535 B1 * | 7/2004 | McGrath et al. | 416/97 R |
| 6,893,210 B2 * | 5/2005 | Zhang et al. | 415/116 |
| 6,994,520 B2 * | 2/2006 | Humanchuk et al. | 415/191 |
| 7,887,295 B2 * | 2/2011 | Brittingham et al. | 416/189 |

OTHER PUBLICATIONS

U.S. Application of Brittingham et al.; U.S. Appl. No. 11/987,315, filed Nov. 29, 2007.
U.S. Application of Delong et al.; U.S. Appl. No. 11/882,373, filed Aug. 1, 2007.
U.S. Application of Chiruato et al.; U.S. Appl. No. 11/892,355, filed Aug. 22, 2007.
U.S. Application of Arness et al.; U.S. Appl. No. 11/882,531, filed Aug. 2, 2007.

* cited by examiner

*Primary Examiner* — Igor Kershteyn
(74) *Attorney, Agent, or Firm* — Nixon & Vanderhye PC (57) ABSTRACT

A turbine bucket including a bucket airfoil having a hollow tip shroud, the hollow tip shroud having a hollow core having a nominal profile substantially in accordance with Cartesian coordinate values of X, Y and Z set forth in Table I, in inches, wherein the shape of the core is defined by the cloud of points listed which are distributed around each surface of the shroud, and the complete hollow portion of the tip shroud could be constructed by defining smooth sheet surfaces through the listed points.

15 Claims, 5 Drawing Sheets

TURBINE BUCKET SHROUD INTERNAL CORE PROFILE

BACKGROUND OF THE INVENTION

The present invention relates to turbine buckets having an airfoil and a tip shroud carried by the airfoil. More particularly, the invention relates to the internal core profile of a tip shroud carried by an airfoil of a turbine bucket. While the invention is intended in particular for a gas turbine, the use of a scaled design could be applicable to a steam turbine or aircraft engine.

Buckets for turbines typically comprise an airfoil, a platform, a shank and dovetail. The dovetail is secured in a complementary slot in a turbine wheel. Oftentimes, the airfoil includes an integrally formed tip shroud. The buckets including the airfoil and tip shroud are, of course, rotatable about the engine centerline during operation and the airfoil and the tip shroud are located in the hot gas path. Because the tip shroud is mounted at the tip of the airfoil, substantial stresses occur in the tip shroud fillet region between the tip shroud and the airfoil tip. Tip shrouds, whether hollow or solid, are typically designed to balance the mass distribution of the shroud around the top of the airfoil. A benefit of the hollow shroud is that it provides a shroud of reduced weight, but maintains considerable structural stiffness. This results in generally lower stresses in the airfoil-to-tip shroud fillet and improved creep life. Further, certain prior tip shrouds do not cover the airfoil throat, with resultant negative impact on stage efficiency due to flow leakage over the tip shroud.

BRIEF DESCRIPTION OF THE INVENTION

In accordance with an example embodiment of the present invention, there is provided an article of manufacture including a bucket airfoil having a hollow tip shroud, said hollow tip shroud having a hollow core having a nominal profile substantially in accordance with Cartesian coordinate values of X, Y and Z set forth in Table I, in inches, wherein the shape of the core is defined by the cloud of points listed which are distributed around each surface of the shroud, and the complete hollow portion of the tip shroud could be constructed by defining smooth sheet surfaces through the listed points.

The invention may also be embodied in an article of manufacture including a bucket airfoil having a hollow tip shroud, said hollow tip shroud having a hollow core having a nominal profile substantially in accordance with Cartesian coordinate values of X, Y and Z set forth in Table I, in a Cartesian coordinate system having its origin at a point A located 39.600 inches above the cold rotor center line at an intersection of the airfoil mean camber line and the leading-edge airfoil surface, its positive X axis defined by point A and a point B located 39.600 inches above the cold rotor center line at an intersection of the airfoil mean camber line and the trailing-edge airfoil surface, its positive X-Z plane defined by points A, B, and a point C located 49.862 inches above the cold rotor center line at an intersection of the airfoil mean camber line and the airfoil trailing-edge surface, and its Y axis defined using right-hand rule methodology, and wherein X, Y and Z are distances in inches, wherein the shape of the core is defined by the cloud of points listed which are distributed around each surface of the shroud, and the complete hollow portion of the tip shroud could be constructed by defining smooth sheet surfaces through the listed points.

The invention may further be embodied in an article of manufacture comprising a turbine wheel having a plurality of buckets, each of said buckets including an airfoil and a hollow tip shroud, said hollow tip shroud having a hollow core having a nominal profile substantially in accordance with Cartesian coordinate values of X, Y and Z set forth in Table I, in inches, wherein the shape of the core is defined by the cloud of points listed which are distributed around each surface of the shroud, and the complete hollow portion of the tip shroud could be constructed by defining smooth sheet surfaces through the listed points.

BRIEF DESCRIPTION OF THE DRAWINGS

These and other objects and advantages of this invention, will be more completely understood and appreciated by careful study of the following more detailed description of the presently preferred example embodiments of the invention taken in conjunction with the accompanying drawings, in which.

DETAILED DESCRIPTION OF THE INVENTION

Figure 1:
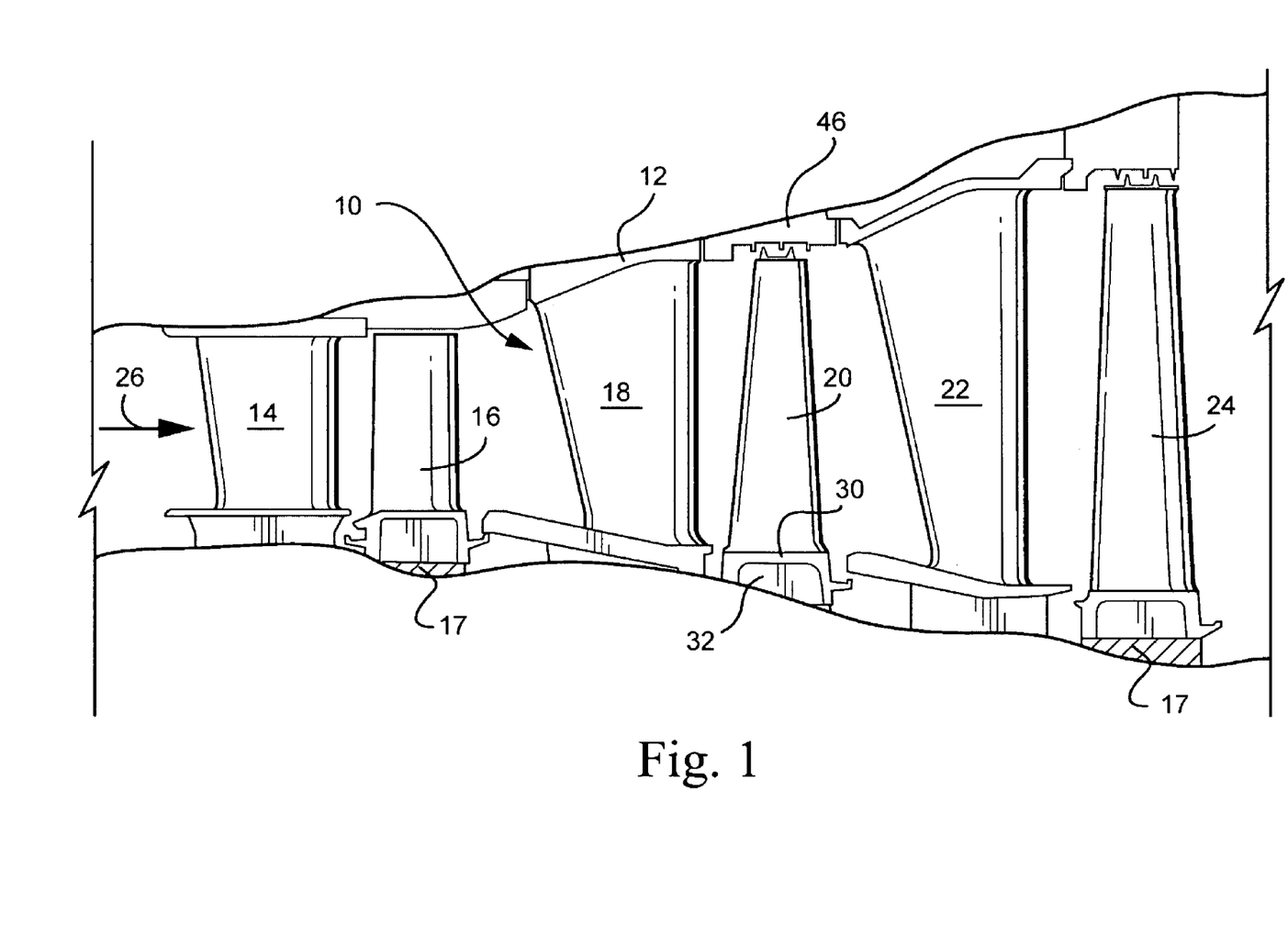
FIG. 1 is a schematic illustration of a turbine section having a second stage turbine bucket tip shroud having a pre-determined shroud core profile according to an example embodiment of the present invention.

Referring now to the drawing figures, particularly to FIG. 1, there is illustrated a hot gas path, generally designated 10, of a gas turbine 12 including a plurality of turbine stages. Three stages are illustrated. For example, the first stage comprises a plurality of circumferentially spaced nozzles 14 and buckets 16. The nozzles are circumferentially spaced one from the other and fixed about the axis of the rotor. The first stage buckets 16, of course, are mounted on the turbine rotor wheel 17. A second stage of the turbine 12 is also illustrated, including a plurality of circumferentially spaced nozzles 18 and a plurality of circumferentially spaced buckets 20 mounted on the rotor. The third stage is also illustrated including a plurality of circumferentially spaced nozzles 22 and buckets 24 mounted on the rotor 17. It will be appreciated that the nozzles and buckets lie in the hot gas path 10 of the turbine 12, the direction of flow of the hot gas through the hot gas path 10 being indicated by the arrow 26.

Figure 2:
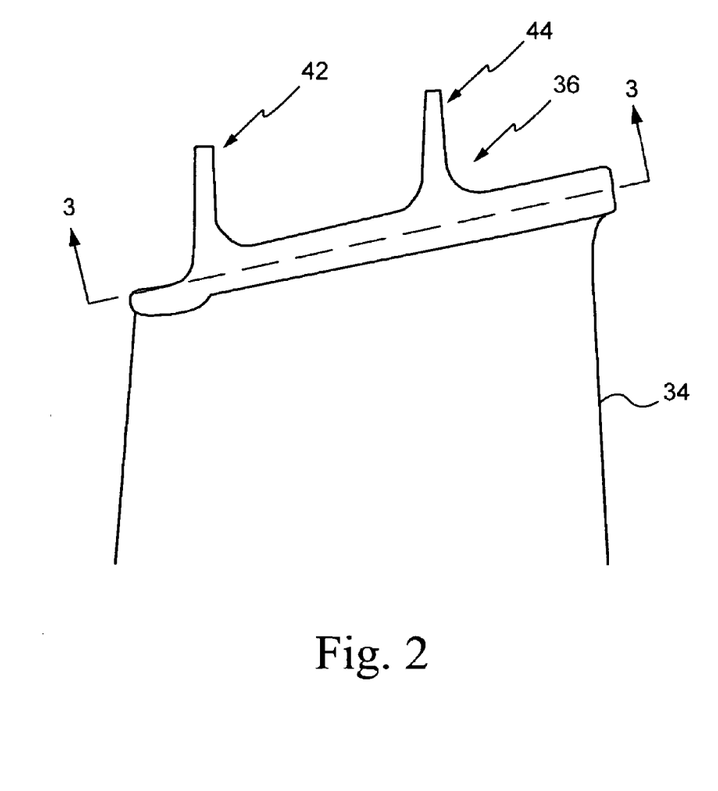
FIG. 2 depicts a turbine blade with a full tip shroud.
Figure 3:
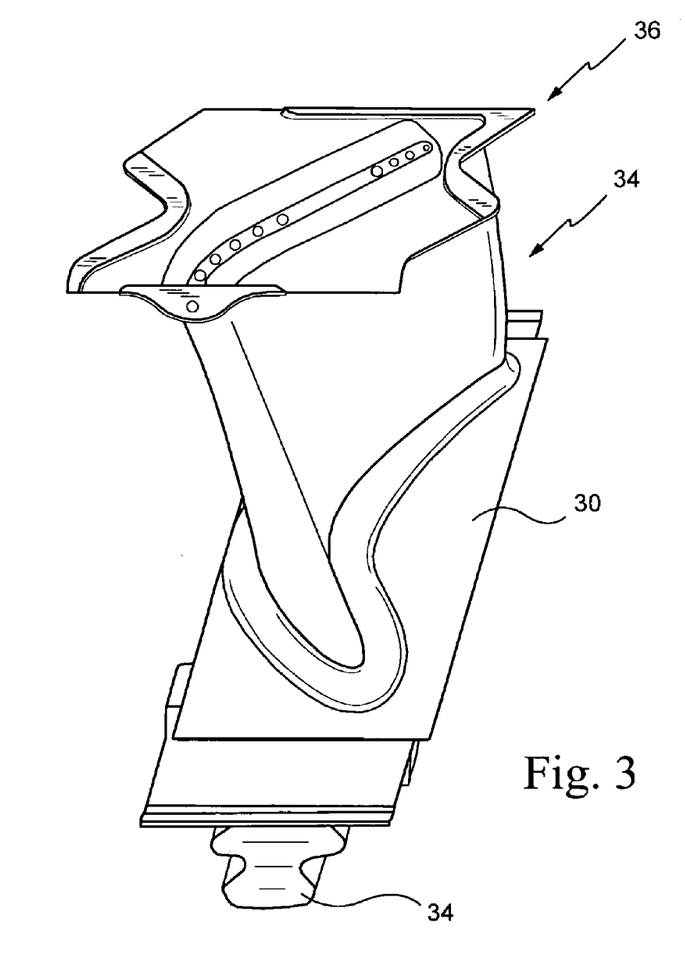
FIG. 3 shows the blade of FIG. 2 with the top portion of the shroud removed along the section shown in FIG. 2 to reveal the interior cavity shape.
Figure 4:
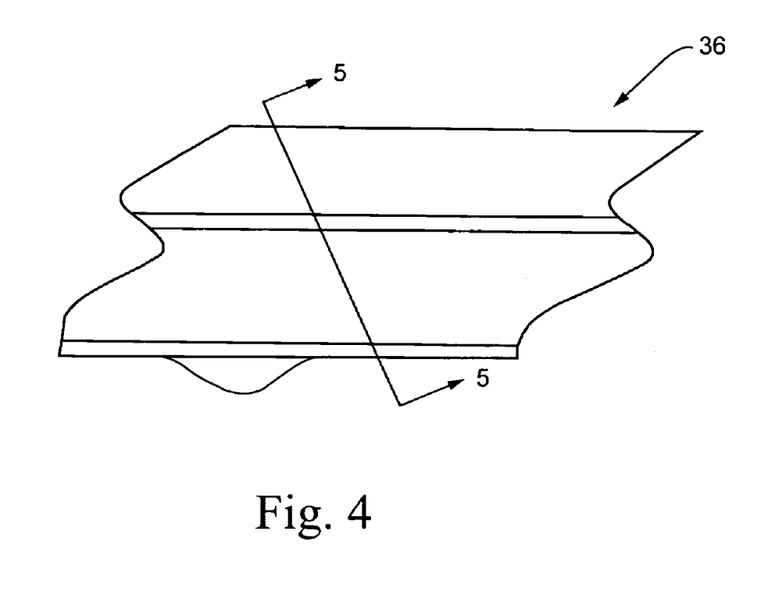
FIG. 4 is a plan view of the shroud of FIG. 2.
Figure 5:
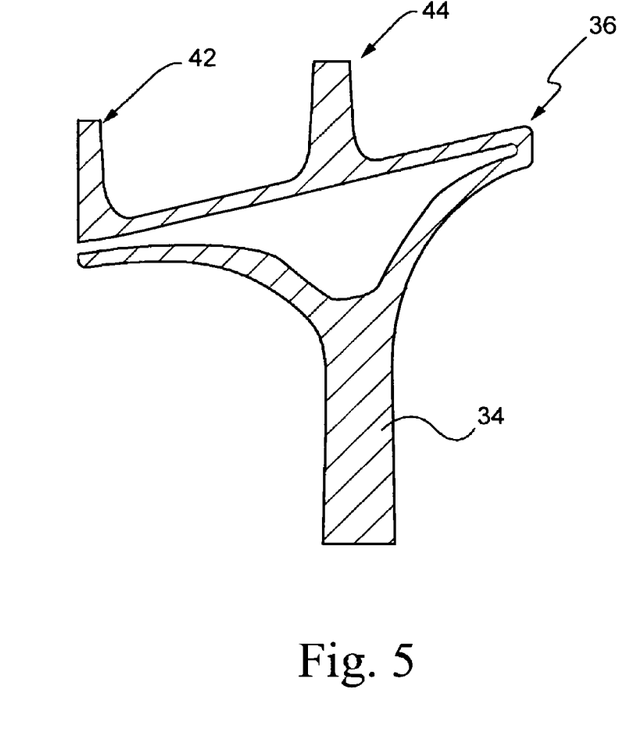
FIG. 5 is another internal view of the shroud, this time cut along the section shown in FIG. 4.

Each bucket 20 of the second stage is provided with a platform 30, a shank 32, and a dovetail 34 (FIG. 3) for connection with a complementary-shaped mating dovetail (not shown) on a rotor wheel forming part of the rotor 17. Each of the second stage buckets 20 also includes an airfoil 34 (FIG. 2) having an airfoil profile at any cross-section along the airfoil from the platform to the airfoil tip.

Each of the second stage buckets is provided with a tip shroud generally designated 36. The tip shrouds are preferably formed integrally with the airfoils 34 and each tip shroud 36 engages at circumferentially opposite ends adjacent tip shrouds of adjacent buckets to form a generally annular ring or shroud circumscribing the hot gas path at the axial location of the second stage buckets. The tip shroud 36 of each second stage bucket 20 includes first and second, leading and trailing, seal rails 42, 44 along its radial outer surface and which seal rails 42, 44 form nearly continuous seal rings about the tip shroud for sealing with the shroud 46 (FIG. 1) fixed to the turbine casing. In this regard, in an example embodiment, the forward seal rail 42 does not contact the corresponding seal rail on the adjacent bucket, but the aft seal rail 44 does in fact contact the corresponding seal rail on the adjacent bucket.

Turbine blades operate in a harsh environment due to thermal and mechanical loading. Furthermore, blades that have a tip shroud have additional challenges. Tip shrouds reside at the outermost extent of a blade, see FIG. 1, thus encountering high mechanical loading due to the rotational speed. It is therefore difficult to attach a non-scalloped shroud to a blade. Compounding this is the requirement that the blade's weight not exceed some maximum value. These constraints point to the benefit of a hollow turbine shroud.

Figure 6:
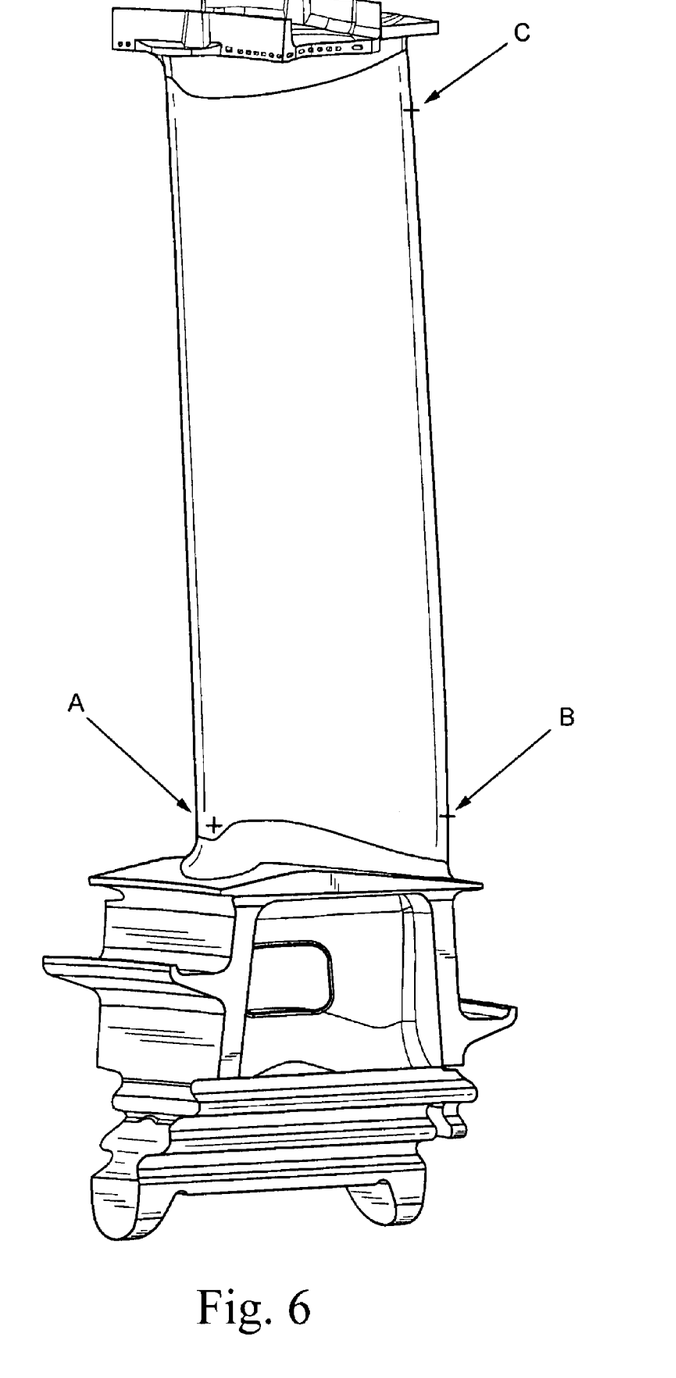
FIG. 6 is a schematic perspective view of the turbine airfoil illustrating points used to determine the coordinate system used to determine the coordinates for the points set forth in Table 1.
Figure 7:
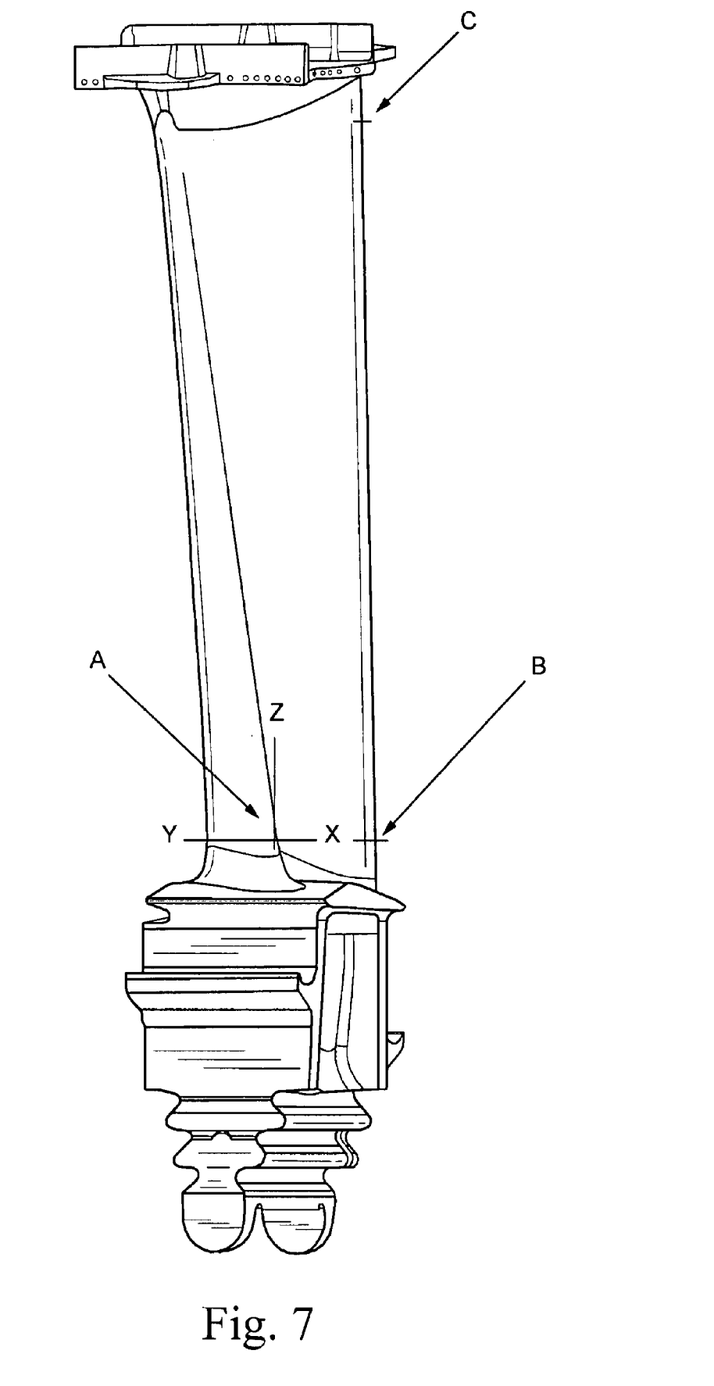
FIG. 7 is a perspective view also illustrating the coordinate system used to determine the coordinates for the points set forth in Table 1.

To define the envelope or volume in which the core design of the invention resides, there is a unique set or loci of points in space. The loci which define the envelope or volume in which the core design resides comprises a set of 789 points with X, Y and Z coordinates relative to the origin coordinate system established as shown in FIGS. 6 and 7. More specifically, the coordinate system is set relative to the airfoil and is fully defined by points A, B and C. Points A and B are both located 39.600 inches above the cold rotor center line. Point A lies at the intersection of the airfoil mean camber line and the leading-edge airfoil surface. Point B lies at the intersection of the airfoil mean camber line and the trailing-edge airfoil surface. Point C is located 49.862 inches above the cold rotor center line and lies at the intersection of the airfoil mean camber line and the airfoil trailing-edge surface. The coordinate system origin is located at point A. Points A and B define the positive X axis. Points A, B and C define the positive X-Z plane. The Y axis is then defined using the right-hand rule methodology.

The Cartesian coordinate system of X, Y and Z values given in Table I below defines the complete hollow portion of the tip shroud. More specifically, the shape of the core is defined by the cloud of points listed which are distributed around each surface of the shroud, and the complete hollow portion of the tip shroud could be constructed by defining smooth sheet surfaces through the listed points. The coordinate values for the X, Y and Z coordinates are set forth in inches in Table I although other units of dimensions may be used if the values are appropriately converted.

The Table I values are generated and shown to 3 decimal places for determining the profile of the shroud core. These points represent the nominal cold or room temperature shape of the shroud core. As the bucket heats up in service, mechanical loading and temperature will cause a change in X, Y and Z's. Accordingly, values for the profile given in Table I represent ambient, non-operating or non-hot conditions.

There are typical manufacturing and coating tolerances which must be accounted for in the actual profile of the shroud core. It will therefore be appreciated that +/- typical manufacturing tolerances, i.e., +/- values, including any coating thickness are additive to the X and Y values given in Table I below. Accordingly, a distance of +/-0.042 inches in a direction normal to any surface location along the shroud core profile defines a shroud core profile envelope for this particular bucket tip shroud design and turbine, i.e., a variation between measured points on the actual shroud core surface at nominal cold or room temperature and the ideal position of these points as given in the Table below at the same temperature. The bucket shroud core design is robust to this range of variation without impairment of mechanical functions.

TABLE 1

| X | Y | Z | X | Y | Z | X | Y | Z |
|---|---|---|---|---|---|---|---|---|
| 0.320 | 2.170 | 10.700 | 1.674 | 1.453 | 10.816 | −0.037 | 2.890 | 10.938 |
| 0.462 | 2.174 | 10.704 | 0.524 | 2.045 | 10.816 | 0.738 | 1.826 | 10.939 |
| 0.373 | 2.132 | 10.707 | 1.763 | 1.495 | 10.831 | −0.001 | 2.935 | 10.939 |
| 0.703 | 2.125 | 10.709 | 1.336 | 1.942 | 10.841 | 0.890 | 1.735 | 10.940 |
| 0.551 | 2.216 | 10.710 | 0.119 | 2.601 | 10.842 | 1.041 | 1.645 | 10.942 |
| 0.344 | 2.119 | 10.710 | 0.240 | 2.344 | 10.846 | 1.344 | 1.464 | 10.943 |
| 0.293 | 2.228 | 10.712 | 1.434 | 1.503 | 10.850 | 1.496 | 1.373 | 10.944 |
| 0.792 | 2.167 | 10.713 | 0.386 | 2.034 | 10.850 | 1.193 | 1.554 | 10.945 |
| 0.854 | 2.035 | 10.720 | 0.353 | 2.105 | 10.850 | −0.067 | 2.908 | 10.946 |
| 0.640 | 2.258 | 10.721 | 0.516 | 2.528 | 10.853 | 0.416 | 1.974 | 10.947 |
| 0.943 | 2.077 | 10.722 | 0.819 | 2.347 | 10.853 | −0.362 | 3.240 | 10.948 |
| 0.310 | 2.265 | 10.725 | 0.667 | 2.437 | 10.854 | 0.240 | 2.886 | 10.948 |
| 1.006 | 1.945 | 10.734 | 0.676 | 1.955 | 10.855 | 0.088 | 2.977 | 10.948 |
| 1.095 | 1.987 | 10.738 | 1.585 | 1.412 | 10.855 | 0.100 | 2.645 | 10.951 |
| 0.400 | 2.307 | 10.738 | 0.364 | 2.618 | 10.856 | 1.647 | 1.283 | 10.952 |
| 0.262 | 2.294 | 10.740 | 1.782 | 1.330 | 10.857 | 1.425 | 1.987 | 10.952 |
| 1.157 | 1.855 | 10.745 | 1.282 | 1.593 | 10.858 | −0.098 | 2.914 | 10.953 |
| 0.489 | 2.350 | 10.750 | 1.826 | 1.364 | 10.859 | 0.216 | 2.399 | 10.956 |
| 0.614 | 2.085 | 10.753 | 0.123 | 2.667 | 10.862 | −0.322 | 3.156 | 10.957 |
| 1.247 | 1.897 | 10.756 | 0.827 | 1.865 | 10.864 | 1.060 | 2.301 | 10.957 |
| 0.360 | 2.087 | 10.757 | 0.970 | 2.256 | 10.864 | −0.259 | 3.256 | 10.959 |
| 0.228 | 2.368 | 10.758 | 1.130 | 1.684 | 10.865 | −0.130 | 2.983 | 10.960 |
| 0.881 | 2.211 | 10.758 | 0.979 | 1.775 | 10.868 | −0.064 | 3.068 | 10.960 |
| 1.309 | 1.765 | 10.761 | 1.737 | 1.322 | 10.871 | 0.372 | 2.068 | 10.960 |
| 0.248 | 2.399 | 10.762 | 0.213 | 2.709 | 10.874 | 0.391 | 2.796 | 10.961 |
| 1.033 | 2.121 | 10.769 | 0.082 | 2.682 | 10.875 | −0.271 | 3.282 | 10.961 |
| 0.730 | 2.302 | 10.770 | 0.188 | 2.457 | 10.875 | −0.220 | 3.173 | 10.963 |
| 0.337 | 2.441 | 10.772 | 0.311 | 2.196 | 10.876 | −0.170 | 3.067 | 10.963 |
| 1.371 | 1.633 | 10.773 | 1.487 | 1.853 | 10.882 | −0.275 | 3.057 | 10.968 |
| 0.187 | 2.455 | 10.774 | 1.122 | 2.166 | 10.886 | 2.040 | 1.144 | 10.970 |
| 0.765 | 1.995 | 10.775 | 1.915 | 1.407 | 10.887 | −0.126 | 3.201 | 10.970 |
| 1.460 | 1.675 | 10.777 | 0.435 | 2.005 | 10.890 | 0.063 | 2.725 | 10.970 |
| 1.398 | 1.807 | 10.778 | 0.049 | 2.754 | 10.900 | 0.026 | 3.110 | 10.971 |
| 0.327 | 2.157 | 10.782 | 0.061 | 2.801 | 10.906 | −0.372 | 3.263 | 10.971 |

TABLE 1-continued

| X | Y | Z | X | Y | Z | X | Y | Z |
|---|---|---|---|---|---|---|---|---|
| 1.220 | 1.723 | 10.782 | 1.888 | 1.233 | 10.909 | 0.275 | 2.274 | 10.973 |
| 1.523 | 1.543 | 10.789 | 0.302 | 2.753 | 10.911 | 0.439 | 1.927 | 10.973 |
| 0.917 | 1.905 | 10.791 | 0.147 | 2.544 | 10.912 | 1.799 | 1.193 | 10.974 |
| 1.068 | 1.814 | 10.791 | 0.605 | 2.572 | 10.913 | 0.177 | 3.020 | 10.975 |
| 0.578 | 2.393 | 10.792 | 0.453 | 2.662 | 10.914 | −0.207 | 3.299 | 10.975 |
| 1.612 | 1.585 | 10.797 | 1.977 | 1.275 | 10.917 | 0.543 | 2.706 | 10.975 |
| 0.186 | 2.532 | 10.799 | 0.150 | 2.843 | 10.917 | −0.228 | 2.957 | 10.976 |
| 1.184 | 2.031 | 10.799 | 0.756 | 2.481 | 10.920 | −0.196 | 2.888 | 10.979 |
| 0.427 | 2.484 | 10.802 | 0.011 | 2.827 | 10.921 | 0.497 | 1.876 | 10.982 |
| 0.150 | 2.535 | 10.808 | 1.639 | 1.764 | 10.932 | 1.211 | 2.212 | 10.984 |
| 1.550 | 1.718 | 10.809 | 0.587 | 1.916 | 10.933 | 0.649 | 1.785 | 10.985 |
| 0.275 | 2.575 | 10.813 | 1.957 | 1.197 | 10.933 | 0.694 | 2.616 | 10.985 |
| 0.287 | 2.245 | 10.815 | 0.908 | 2.391 | 10.936 | −0.037 | 3.243 | 10.986 |
| 0.800 | 1.695 | 10.987 | 0.774 | 1.522 | 11.042 | 0.859 | 0.884 | 11.081 |
| 0.329 | 2.930 | 10.990 | 2.191 | 1.056 | 11.043 | 2.227 | 0.981 | 11.082 |
| −0.370 | 3.259 | 10.990 | −0.224 | 2.951 | 11.044 | 2.280 | 1.099 | 11.082 |
| 0.952 | 1.604 | 10.990 | 0.608 | 2.759 | 11.044 | 0.150 | 2.849 | 11.083 |
| 2.129 | 1.187 | 10.991 | −0.037 | 3.245 | 11.045 | 1.139 | 1.210 | 11.084 |
| −0.277 | 3.292 | 10.992 | 0.202 | 3.106 | 11.046 | 0.946 | 0.699 | 11.084 |
| −0.070 | 3.283 | 10.992 | 0.225 | 2.383 | 11.046 | 1.006 | 0.571 | 11.086 |
| 2.067 | 1.320 | 10.993 | 0.618 | 1.547 | 11.048 | 1.004 | 0.339 | 11.086 |
| 0.846 | 2.526 | 10.997 | 0.925 | 1.432 | 11.049 | 0.010 | 2.834 | 11.086 |
| 1.104 | 1.514 | 10.998 | 0.291 | 2.243 | 11.049 | 0.177 | 3.023 | 11.086 |
| −0.355 | 3.228 | 10.999 | 1.710 | 1.153 | 11.051 | 0.871 | 1.084 | 11.086 |
| −0.201 | 3.305 | 11.000 | 0.684 | 1.480 | 11.055 | 1.067 | 0.442 | 11.087 |
| 0.009 | 2.832 | 11.000 | 0.026 | 3.113 | 11.055 | 1.126 | 0.315 | 11.089 |
| 0.490 | 1.817 | 11.002 | 1.317 | 1.293 | 11.055 | 0.961 | 1.126 | 11.090 |
| −0.049 | 2.901 | 11.005 | 1.514 | 2.033 | 11.056 | 1.092 | 0.154 | 11.092 |
| 1.790 | 1.676 | 11.007 | −0.196 | 2.890 | 11.056 | 0.061 | 2.807 | 11.093 |
| −0.307 | 3.126 | 11.007 | 0.642 | 1.477 | 11.056 | 0.934 | 0.951 | 11.093 |
| 2.099 | 1.081 | 11.009 | 0.358 | 2.100 | 11.056 | 1.086 | 2.480 | 11.094 |
| −0.125 | 2.909 | 11.009 | 0.351 | 2.980 | 11.059 | 1.165 | −0.002 | 11.095 |
| 1.255 | 1.424 | 11.009 | 0.639 | 1.422 | 11.061 | 0.240 | 2.891 | 11.096 |
| 1.950 | 1.104 | 11.012 | 0.836 | 1.390 | 11.061 | 0.213 | 2.717 | 11.096 |
| 0.560 | 1.744 | 11.013 | 0.557 | 1.290 | 11.062 | 0.577 | 1.635 | 11.097 |
| 0.125 | 3.168 | 11.014 | 2.102 | 1.015 | 11.063 | 1.620 | 1.113 | 11.098 |
| 1.363 | 2.122 | 11.015 | 0.625 | 1.381 | 11.063 | 0.304 | 3.007 | 11.099 |
| −0.215 | 3.160 | 11.016 | −0.128 | 2.912 | 11.064 | 1.182 | 0.090 | 11.100 |
| −0.111 | 3.299 | 11.016 | 0.421 | 1.966 | 11.064 | 0.074 | 2.705 | 11.100 |
| 0.711 | 1.654 | 11.017 | 0.143 | 3.150 | 11.066 | 1.058 | 0.687 | 11.100 |
| 0.997 | 2.436 | 11.018 | 0.747 | 1.348 | 11.067 | 1.291 | 1.120 | 11.102 |
| −0.258 | 3.022 | 11.019 | 0.088 | 2.981 | 11.068 | 1.942 | 1.588 | 11.102 |
| 0.292 | 3.024 | 11.020 | 0.764 | 2.680 | 11.068 | 2.013 | 0.974 | 11.103 |
| 0.863 | 1.563 | 11.021 | 0.681 | 1.026 | 11.068 | 1.112 | 1.036 | 11.105 |
| 1.407 | 1.334 | 11.022 | −0.001 | 2.939 | 11.068 | 0.275 | 2.584 | 11.107 |
| 0.012 | 3.256 | 11.024 | 0.679 | 1.266 | 11.070 | 1.232 | 0.281 | 11.108 |
| 0.543 | 1.705 | 11.025 | 0.987 | 1.300 | 11.071 | 0.123 | 2.675 | 11.109 |
| −0.126 | 3.203 | 11.028 | 1.861 | 1.063 | 11.071 | 0.639 | 1.498 | 11.109 |
| 1.014 | 1.473 | 11.028 | 0.935 | 2.570 | 11.072 | 1.183 | 0.422 | 11.109 |
| −0.153 | 3.028 | 11.033 | 1.300 | 2.256 | 11.072 | 1.259 | 0.120 | 11.110 |
| 0.105 | 2.638 | 11.037 | 0.789 | 0.796 | 11.073 | 1.285 | 0.035 | 11.110 |
| −0.020 | 3.269 | 11.037 | 0.115 | 3.155 | 11.073 | 1.085 | 0.861 | 11.111 |
| 0.622 | 1.612 | 11.037 | 0.731 | 1.156 | 11.075 | 0.337 | 2.452 | 11.114 |
| 1.558 | 1.244 | 11.037 | 1.469 | 1.203 | 11.075 | 1.666 | 1.944 | 11.115 |
| 0.061 | 2.732 | 11.038 | −0.044 | 2.900 | 11.076 | 0.625 | 1.383 | 11.115 |
| 0.459 | 2.883 | 11.038 | 0.809 | 1.216 | 11.078 | 0.148 | 2.549 | 11.115 |
| 0.168 | 2.504 | 11.039 | 0.888 | 0.586 | 11.078 | 1.531 | 1.071 | 11.115 |
| 1.166 | 1.383 | 11.039 | 0.791 | 1.029 | 11.079 | 0.892 | 2.656 | 11.117 |
| −0.064 | 3.070 | 11.039 | 0.497 | 1.806 | 11.079 | 0.329 | 2.934 | 11.118 |
| 0.589 | 1.608 | 11.040 | 0.523 | 2.834 | 11.080 | 0.668 | 1.056 | 11.119 |
| 1.238 | 2.391 | 11.119 | 0.934 | 0.953 | 11.143 | 1.567 | 0.766 | 11.167 |
| 0.186 | 2.543 | 11.120 | 0.373 | 2.146 | 11.144 | 1.210 | 0.598 | 11.168 |
| 1.210 | 0.597 | 11.121 | 1.415 | 0.856 | 11.144 | 0.640 | 1.431 | 11.170 |
| 0.400 | 2.320 | 11.121 | 0.747 | 1.351 | 11.144 | 0.925 | 1.435 | 11.171 |
| 0.735 | 2.696 | 11.121 | 0.378 | 2.062 | 11.145 | 0.622 | 1.617 | 11.171 |
| 2.218 | 1.233 | 11.122 | 1.594 | 0.940 | 11.146 | 0.634 | 1.516 | 11.171 |
| 1.772 | 1.023 | 11.123 | 1.286 | 0.035 | 11.147 | 1.335 | 0.333 | 11.171 |
| 1.442 | 1.030 | 11.123 | 1.389 | 2.301 | 11.147 | 1.745 | 0.850 | 11.172 |
| 0.741 | 0.900 | 11.123 | 0.676 | 1.965 | 11.148 | 1.719 | −0.043 | 11.172 |
| 1.264 | 0.946 | 11.123 | 1.924 | 0.933 | 11.148 | 1.666 | 0.118 | 11.174 |
| 1.361 | 0.142 | 11.125 | 1.524 | 0.109 | 11.149 | 2.075 | 0.844 | 11.175 |
| 0.230 | 2.376 | 11.126 | 1.524 | 0.109 | 11.149 | 0.987 | 1.303 | 11.175 |
| 0.720 | 1.176 | 11.126 | 1.058 | 0.688 | 11.149 | 1.540 | 0.592 | 11.175 |
| 2.254 | 0.926 | 11.126 | 1.481 | 0.253 | 11.149 | 0.827 | 1.875 | 11.176 |
| 0.819 | 0.735 | 11.127 | 0.578 | 2.405 | 11.150 | 2.316 | 0.795 | 11.180 |
| 2.343 | 0.968 | 11.127 | 0.649 | 1.790 | 11.150 | 1.541 | 2.211 | 11.180 |
| 0.391 | 2.802 | 11.127 | 0.836 | 1.393 | 11.150 | 1.817 | 1.856 | 11.181 |
| 0.248 | 2.410 | 11.128 | 2.164 | 0.885 | 11.150 | 1.028 | 2.672 | 11.182 |

TABLE 1-continued

| X | Y | Z | X | Y | Z | X | Y | Z |
|---|---|---|---|---|---|---|---|---|
| 0.782 | 1.043 | 11.128 | 0.435 | 2.014 | 11.152 | 1.112 | 1.038 | 11.183 |
| 0.462 | 2.187 | 11.128 | 0.658 | 1.309 | 11.153 | 1.763 | 0.043 | 11.186 |
| 1.404 | 0.072 | 11.128 | 1.388 | 0.682 | 11.153 | 1.237 | 0.773 | 11.187 |
| 1.335 | 0.332 | 11.129 | 0.584 | 1.235 | 11.153 | 0.694 | 2.622 | 11.188 |
| 0.908 | 0.545 | 11.130 | 1.183 | 0.423 | 11.153 | 1.524 | 0.109 | 11.188 |
| 1.237 | 0.771 | 11.131 | 0.445 | 1.919 | 11.154 | 0.952 | 1.611 | 11.188 |
| 0.845 | 0.911 | 11.132 | 1.308 | 0.158 | 11.155 | 1.665 | 0.327 | 11.189 |
| 0.993 | 0.365 | 11.133 | 0.774 | 1.526 | 11.155 | 1.361 | 0.508 | 11.190 |
| 1.024 | 2.614 | 11.133 | 0.711 | 1.658 | 11.155 | 1.718 | 0.676 | 11.191 |
| 1.088 | 0.164 | 11.134 | 2.405 | 0.837 | 11.156 | 0.854 | 2.050 | 11.192 |
| 0.907 | 0.778 | 11.135 | 0.640 | 2.272 | 11.156 | 1.014 | 1.478 | 11.193 |
| 1.166 | −0.002 | 11.135 | 0.961 | 1.128 | 11.157 | 1.986 | 0.802 | 11.193 |
| 0.480 | 2.844 | 11.135 | 0.543 | 2.712 | 11.158 | 1.486 | 0.243 | 11.193 |
| 0.524 | 2.055 | 11.135 | 0.497 | 1.881 | 11.160 | 1.548 | 0.111 | 11.194 |
| 0.306 | 2.213 | 11.136 | 1.556 | 0.203 | 11.160 | 1.915 | −0.194 | 11.194 |
| 0.310 | 2.278 | 11.136 | 0.509 | 1.783 | 11.160 | 0.783 | 2.665 | 11.194 |
| 0.453 | 2.669 | 11.136 | 0.886 | 2.661 | 11.160 | 0.756 | 2.490 | 11.195 |
| 0.809 | 1.218 | 11.136 | 0.800 | 1.700 | 11.161 | 2.494 | 0.880 | 11.196 |
| 0.969 | 0.646 | 11.137 | 0.557 | 1.293 | 11.161 | 2.467 | 0.705 | 11.198 |
| 1.031 | 0.513 | 11.139 | 0.644 | 2.722 | 11.161 | 1.897 | 0.761 | 11.199 |
| 1.683 | 0.982 | 11.140 | 0.703 | 2.140 | 11.163 | 1.691 | 0.502 | 11.199 |
| 0.871 | 1.085 | 11.140 | 1.085 | 0.863 | 11.164 | 1.869 | −0.039 | 11.199 |
| 1.094 | 0.381 | 11.141 | 1.406 | 0.072 | 11.165 | 0.819 | 2.358 | 11.201 |
| 0.587 | 1.923 | 11.142 | 0.607 | 1.358 | 11.165 | 1.139 | 1.213 | 11.202 |
| 1.156 | 0.248 | 11.143 | 0.560 | 1.749 | 11.166 | 2.093 | 1.501 | 11.202 |
| 1.468 | 0.166 | 11.143 | 1.513 | 0.417 | 11.166 | 2.227 | 0.754 | 11.204 |
| 1.361 | 0.507 | 11.143 | 0.571 | 1.650 | 11.166 | 0.979 | 1.786 | 11.204 |
| 0.516 | 2.537 | 11.143 | 1.834 | 0.892 | 11.166 | 0.881 | 2.225 | 11.208 |
| 1.218 | 0.116 | 11.143 | 0.684 | 1.484 | 11.167 | 1.264 | 0.949 | 11.208 |
| 1.025 | 2.674 | 11.208 | 1.157 | 1.871 | 11.249 | 1.202 | 2.951 | 11.285 |
| 2.557 | 0.748 | 11.209 | 2.289 | 0.623 | 11.249 | 1.256 | 3.052 | 11.285 |
| 1.867 | 0.100 | 11.211 | 1.036 | 2.670 | 11.250 | 2.770 | 0.527 | 11.286 |
| 1.973 | −0.120 | 11.211 | 2.370 | 1.147 | 11.251 | 2.092 | −0.116 | 11.286 |
| 1.388 | 0.684 | 11.212 | 1.969 | 1.767 | 11.252 | 1.443 | 2.654 | 11.288 |
| 1.816 | 0.237 | 11.212 | 1.442 | 1.034 | 11.253 | 2.266 | 0.357 | 11.288 |
| 2.111 | −0.346 | 11.213 | 1.060 | 2.311 | 11.254 | 1.558 | 1.252 | 11.290 |
| 1.718 | −0.041 | 11.213 | 2.200 | 0.581 | 11.254 | 2.235 | 0.275 | 11.291 |
| 1.513 | 0.419 | 11.214 | 1.567 | 0.769 | 11.256 | 1.719 | 2.299 | 11.291 |
| 1.104 | 1.521 | 11.216 | 2.530 | 0.575 | 11.256 | 1.319 | 2.920 | 11.292 |
| 2.432 | 1.013 | 11.216 | 2.119 | 0.058 | 11.257 | 1.216 | 3.018 | 11.293 |
| 1.870 | 0.587 | 11.216 | 2.065 | −0.291 | 11.257 | 1.336 | 1.956 | 11.293 |
| 1.700 | 0.021 | 11.216 | 1.691 | 0.504 | 11.258 | 2.202 | 0.006 | 11.296 |
| 1.638 | 0.154 | 11.217 | 1.282 | 1.606 | 11.259 | 1.968 | 0.150 | 11.297 |
| 0.933 | 2.649 | 11.218 | 1.568 | 2.388 | 11.260 | 2.595 | 0.480 | 11.297 |
| 1.693 | 2.122 | 11.219 | 1.816 | 0.239 | 11.260 | 1.683 | 0.987 | 11.298 |
| 1.006 | 1.961 | 11.220 | 2.003 | −0.159 | 11.260 | 1.238 | 2.396 | 11.299 |
| 2.061 | −0.188 | 11.221 | 2.105 | −0.341 | 11.261 | 1.283 | 3.227 | 11.299 |
| 2.137 | 0.713 | 11.221 | 1.024 | 2.618 | 11.262 | 2.368 | 0.438 | 11.299 |
| 1.843 | 0.412 | 11.222 | 1.292 | 2.744 | 11.263 | 2.245 | 1.413 | 11.300 |
| 2.048 | 0.671 | 11.226 | 1.176 | 2.839 | 11.263 | 1.183 | 2.858 | 11.300 |
| 1.203 | 2.701 | 11.227 | 1.941 | −0.026 | 11.264 | 2.181 | −0.074 | 11.301 |
| 1.120 | 2.737 | 11.228 | 2.181 | −0.075 | 11.265 | 1.460 | 1.692 | 11.302 |
| 1.291 | 1.124 | 11.228 | 1.844 | 2.033 | 11.265 | 2.478 | 0.466 | 11.302 |
| 2.378 | 0.664 | 11.230 | 1.184 | 2.046 | 11.265 | 1.234 | 3.110 | 11.302 |
| 1.130 | 1.696 | 11.232 | 2.710 | 0.566 | 11.266 | 1.345 | 3.095 | 11.307 |
| 1.416 | 2.478 | 11.232 | 2.173 | 0.407 | 11.266 | 1.870 | 0.590 | 11.308 |
| 1.415 | 0.859 | 11.232 | 1.229 | 2.877 | 11.266 | 1.208 | 2.979 | 11.309 |
| 2.142 | −0.251 | 11.234 | 1.407 | 1.341 | 11.267 | 1.585 | 1.427 | 11.309 |
| 2.030 | 0.015 | 11.235 | 2.146 | 0.233 | 11.269 | 1.309 | 3.355 | 11.310 |
| 1.540 | 0.594 | 11.235 | 2.708 | 0.659 | 11.273 | 1.363 | 2.132 | 11.310 |
| 1.968 | 0.148 | 11.235 | 1.531 | 1.077 | 11.273 | 2.316 | 0.388 | 11.311 |
| 1.033 | 2.136 | 11.237 | 1.120 | 2.733 | 11.275 | 2.761 | 0.449 | 11.311 |
| 2.628 | 0.702 | 11.237 | 1.309 | 1.781 | 11.276 | 1.255 | 3.217 | 11.313 |
| 1.911 | −0.191 | 11.237 | 2.262 | 0.449 | 11.276 | 1.265 | 2.571 | 11.314 |
| 2.126 | −0.357 | 11.237 | 2.127 | −0.234 | 11.276 | 1.595 | 2.565 | 11.314 |
| 2.619 | 0.616 | 11.238 | 2.440 | 0.533 | 11.276 | 1.710 | 1.162 | 11.316 |
| 1.665 | 0.329 | 11.239 | 2.156 | −0.189 | 11.278 | 2.230 | 0.143 | 11.318 |
| 1.851 | −0.069 | 11.239 | 2.351 | 0.492 | 11.281 | 1.332 | 3.461 | 11.320 |
| 0.935 | 2.576 | 11.240 | 1.718 | 0.679 | 11.282 | 1.996 | 1.944 | 11.320 |
| 2.021 | 0.497 | 11.241 | 1.843 | 0.414 | 11.282 | 1.278 | 3.325 | 11.320 |
| 1.255 | 1.431 | 11.242 | 1.211 | 2.221 | 11.283 | 1.229 | 2.879 | 11.321 |
| 1.114 | 2.734 | 11.245 | 1.434 | 1.517 | 11.284 | 2.120 | 1.679 | 11.321 |
| 1.994 | 0.322 | 11.246 | 1.113 | 2.661 | 11.284 | 1.470 | 2.830 | 11.321 |
| 1.317 | 1.299 | 11.247 | 2.208 | 0.101 | 11.285 | 1.372 | 3.270 | 11.321 |
| 2.159 | −0.174 | 11.247 | 2.646 | 0.792 | 11.285 | 2.021 | 0.499 | 11.323 |
| 0.997 | 2.443 | 11.248 | 2.681 | 0.485 | 11.285 | 2.119 | 0.060 | 11.324 |
| 2.583 | 0.926 | 11.326 | 1.564 | 3.319 | 11.367 | 2.991 | 0.440 | 11.406 |
| 1.834 | 0.897 | 11.326 | 1.649 | 2.916 | 11.368 | 1.490 | 3.509 | 11.407 |

TABLE 1-continued

| X | Y | Z | X | Y | Z | X | Y | Z |
|---|---|---|---|---|---|---|---|---|
| 2.428 | 0.444 | 11.326 | 2.493 | 0.447 | 11.369 | 1.490 | 3.509 | 11.407 |
| 1.994 | 0.325 | 11.327 | 1.728 | 1.820 | 11.369 | 2.067 | 1.333 | 11.408 |
| 1.389 | 2.307 | 11.327 | 1.372 | 3.271 | 11.370 | 1.925 | 2.561 | 11.410 |
| 1.292 | 2.746 | 11.328 | 2.013 | 0.983 | 11.370 | 2.735 | 0.838 | 11.411 |
| 1.871 | 2.210 | 11.328 | 1.568 | 2.392 | 11.371 | 3.067 | 0.313 | 11.411 |
| 1.305 | 3.447 | 11.329 | 2.137 | 0.718 | 11.372 | 1.827 | 3.001 | 11.412 |
| 1.358 | 3.587 | 11.330 | 1.470 | 2.832 | 11.372 | 2.191 | 1.068 | 11.413 |
| 1.897 | 0.765 | 11.331 | 2.200 | 0.585 | 11.373 | 2.316 | 0.803 | 11.414 |
| 1.246 | 3.146 | 11.331 | 2.023 | 2.120 | 11.373 | 3.080 | 0.266 | 11.414 |
| 2.696 | 0.446 | 11.333 | 2.903 | 0.354 | 11.373 | 1.551 | 3.357 | 11.415 |
| 1.256 | 3.054 | 11.335 | 2.396 | 1.325 | 11.375 | 1.746 | 2.477 | 11.415 |
| 1.737 | 1.337 | 11.335 | 2.147 | 1.855 | 11.377 | 1.906 | 1.905 | 11.415 |
| 1.497 | 3.005 | 11.338 | 1.348 | 3.596 | 11.378 | 1.776 | 3.332 | 11.416 |
| 1.514 | 2.042 | 11.338 | 1.898 | 2.386 | 11.379 | 2.830 | 0.383 | 11.416 |
| 1.328 | 3.567 | 11.342 | 1.773 | 2.651 | 11.380 | 1.649 | 2.917 | 11.416 |
| 1.416 | 2.482 | 11.342 | 2.973 | 0.421 | 11.381 | 2.049 | 2.296 | 11.417 |
| 1.576 | 1.909 | 11.342 | 1.915 | 1.423 | 11.381 | 2.511 | 0.455 | 11.417 |
| 1.319 | 2.921 | 11.343 | 2.272 | 1.591 | 11.382 | 2.174 | 2.031 | 11.420 |
| 1.746 | 2.475 | 11.344 | 1.693 | 2.127 | 11.382 | 2.673 | 0.971 | 11.423 |
| 2.582 | 0.458 | 11.344 | 1.675 | 3.091 | 11.382 | 2.614 | 0.460 | 11.424 |
| 1.861 | 1.072 | 11.344 | 2.173 | 0.411 | 11.383 | 1.952 | 2.736 | 11.426 |
| 1.281 | 3.328 | 11.345 | 1.399 | 3.446 | 11.384 | 1.871 | 2.213 | 11.426 |
| 2.922 | 0.439 | 11.347 | 2.603 | 0.457 | 11.385 | 2.093 | 1.508 | 11.426 |
| 2.277 | 0.317 | 11.348 | 1.595 | 2.567 | 11.386 | 1.870 | 3.113 | 11.427 |
| 1.283 | 3.229 | 11.348 | 1.497 | 3.007 | 11.387 | 2.299 | 1.767 | 11.427 |
| 2.521 | 1.059 | 11.349 | 1.755 | 1.995 | 11.387 | 2.440 | 0.538 | 11.428 |
| 1.622 | 2.740 | 11.350 | 2.310 | 0.371 | 11.387 | 1.773 | 2.652 | 11.430 |
| 1.701 | 1.645 | 11.350 | 1.637 | 3.417 | 11.388 | 1.675 | 3.092 | 11.431 |
| 2.208 | 0.103 | 11.351 | 2.040 | 1.158 | 11.389 | 2.548 | 1.237 | 11.432 |
| 1.524 | 3.180 | 11.352 | 2.797 | 0.705 | 11.389 | 2.423 | 1.502 | 11.432 |
| 2.048 | 0.675 | 11.352 | 2.235 | 0.278 | 11.390 | 2.218 | 1.243 | 11.432 |
| 2.860 | 0.571 | 11.353 | 2.984 | 0.307 | 11.391 | 2.343 | 0.978 | 11.435 |
| 2.361 | 0.407 | 11.353 | 2.708 | 0.441 | 11.393 | 1.632 | 3.423 | 11.436 |
| 1.763 | 1.512 | 11.354 | 2.164 | 0.893 | 11.393 | 1.996 | 1.948 | 11.436 |
| 1.541 | 2.217 | 11.354 | 2.289 | 0.628 | 11.396 | 1.640 | 3.399 | 11.437 |
| 2.833 | 0.397 | 11.355 | 1.880 | 1.730 | 11.396 | 2.076 | 2.472 | 11.437 |
| 1.345 | 3.096 | 11.357 | 1.800 | 2.826 | 11.397 | 2.708 | 0.446 | 11.437 |
| 1.443 | 2.657 | 11.357 | 2.289 | 0.628 | 11.398 | 2.467 | 0.713 | 11.438 |
| 1.319 | 3.525 | 11.359 | 2.407 | 0.433 | 11.398 | 2.917 | 0.330 | 11.438 |
| 1.498 | 3.502 | 11.359 | 1.719 | 2.302 | 11.398 | 3.074 | 0.351 | 11.440 |
| 1.310 | 3.404 | 11.361 | 1.942 | 1.598 | 11.400 | 1.898 | 2.388 | 11.443 |
| 2.247 | 0.243 | 11.362 | 1.524 | 3.182 | 11.401 | 2.016 | 2.804 | 11.443 |
| 2.146 | 0.236 | 11.362 | 1.622 | 2.742 | 11.401 | 1.916 | 3.247 | 11.444 |
| 1.888 | 1.247 | 11.363 | 1.488 | 3.489 | 11.406 | 2.120 | 1.683 | 11.445 |
| 2.718 | 0.437 | 11.365 | 2.262 | 0.454 | 11.406 | 1.702 | 3.267 | 11.445 |
| 1.800 | 2.828 | 11.446 | 2.304 | 2.423 | 11.484 | | | |
| 3.011 | 0.484 | 11.448 | 2.076 | 2.473 | 11.487 | | | |
| 3.079 | 0.262 | 11.448 | 3.002 | 0.568 | 11.488 | | | |
| 2.201 | 2.207 | 11.448 | 2.299 | 1.769 | 11.489 | | | |
| 2.245 | 1.418 | 11.451 | 2.909 | 0.763 | 11.489 | | | |
| 1.981 | 3.110 | 11.452 | 2.368 | 2.286 | 11.490 | | | |
| 2.023 | 2.123 | 11.453 | 3.066 | 0.431 | 11.491 | | | |
| 2.263 | 2.074 | 11.453 | 1.915 | 3.250 | 11.492 | | | |
| 3.111 | 0.304 | 11.454 | 2.423 | 1.504 | 11.495 | | | |
| 3.004 | 0.276 | 11.455 | 2.984 | 0.311 | 11.496 | | | |
| 2.370 | 1.153 | 11.456 | 2.041 | 2.781 | 11.497 | | | |
| 2.145 | 2.530 | 11.456 | 2.201 | 2.208 | 11.498 | | | |
| 2.994 | 0.308 | 11.457 | 2.548 | 1.239 | 11.499 | | | |
| 2.494 | 0.888 | 11.459 | 1.980 | 3.113 | 11.500 | | | |
| 1.925 | 2.563 | 11.459 | 2.673 | 0.974 | 11.502 | | | |
| 2.045 | 2.972 | 11.459 | 2.263 | 2.076 | 11.502 | | | |
| 2.619 | 0.623 | 11.460 | 2.922 | 0.444 | 11.504 | | | |
| 2.949 | 0.617 | 11.461 | 2.797 | 0.709 | 11.504 | | | |
| 1.827 | 3.003 | 11.461 | 2.044 | 2.976 | 11.508 | | | |
| 2.388 | 1.810 | 11.461 | 2.044 | 2.976 | 11.508 | | | |
| 2.147 | 1.858 | 11.463 | 2.165 | 2.516 | 11.509 | | | |
| 2.681 | 0.491 | 11.463 | 2.388 | 1.811 | 11.511 | | | |
| 1.773 | 3.337 | 11.464 | 2.109 | 2.840 | 11.515 | | | |
| 2.110 | 2.835 | 11.466 | 2.109 | 2.840 | 11.515 | | | |
| 2.255 | 2.295 | 11.466 | 3.072 | 0.266 | 11.516 | | | |
| 2.513 | 1.545 | 11.466 | 2.513 | 1.546 | 11.517 | | | |
| 1.792 | 3.310 | 11.467 | 2.290 | 2.251 | 11.520 | | | |
| 2.887 | 0.750 | 11.469 | 2.637 | 1.281 | 11.521 | | | |
| 2.301 | 2.199 | 11.470 | 2.173 | 2.703 | 11.522 | | | |
| 2.637 | 1.280 | 11.470 | 2.173 | 2.703 | 11.522 | | | |
| 2.272 | 1.593 | 11.470 | 2.762 | 1.016 | 11.524 | | | |
| 2.049 | 2.298 | 11.470 | 3.011 | 0.486 | 11.526 | | | |
| 2.286 | 2.135 | 11.471 | 2.887 | 0.751 | 11.526 | | | |

TABLE 1-continued

| X | Y | Z | X | Y | Z | X | Y | Z |
|---|---|---|---|---|---|---|---|---|
| 2.824 | 0.882 | 11.472 | 2.237 | 2.566 | 11.528 | | | |
| 2.762 | 1.015 | 11.472 | 2.302 | 2.429 | 11.534 | | | |
| 2.175 | 2.698 | 11.472 | 2.366 | 2.292 | 11.539 | | | |
| 2.833 | 0.401 | 11.473 | 2.366 | 2.292 | 11.539 | | | |
| 1.952 | 2.738 | 11.475 | | | | | | |
| 2.396 | 1.328 | 11.475 | | | | | | |
| 2.239 | 2.561 | 11.478 | | | | | | |
| 2.521 | 1.063 | 11.479 | | | | | | |
| 3.077 | 0.262 | 11.479 | | | | | | |
| 2.174 | 2.033 | 11.480 | | | | | | |
| 2.646 | 0.798 | 11.481 | | | | | | |
| 1.916 | 3.045 | 11.483 | | | | | | |
| 2.770 | 0.533 | 11.483 | | | | | | |
| 3.110 | 0.299 | 11.483 | | | | | | |

It will also be appreciated that the shroud core disclosed in the above Table I may be scaled up or down geometrically for use in other similar turbine designs. Consequently, the coordinate values set forth in Table I may be scaled upwardly or downwardly such that the shroud core profile shape remains unchanged. The scaled version of the coordinates in Table I would be represented by X, Y and Z coordinate values of Table I with X and Y and Z coordinates multiplied or divided by a constant number.

An important term in this disclosure is profile. The profile is the range of the variation between measured points on the shroud core surface and the ideal position listed in Table I. The actual profile on a manufactured blade will be different than those in Table I and the design is robust to this variation meaning that mechanical function is not impaired. As noted above, a + or −0.042 inch profile tolerance is used herein.

Hollow turbine shrouds are advantageous for creating high performance turbine buckets. This specific set of points defines a shroud core for use on a 7FA+e stage 2 bucket and, particularly when coupled with a prescribed shroud tip external profile, optimizes wall thickness distribution, mechanical load transfer, and heat transfer distribution.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An article of manufacture including a bucket airfoil having a hollow tip shroud, said hollow tip shroud having a hollow core having a nominal profile substantially in accordance with Cartesian coordinate values of X, Y and Z set forth in Table I, in inches, wherein the shape of the core is defined by the cloud of points listed which are distributed around each surface of the shroud, and the complete hollow portion of the tip shroud could be constructed by defining smooth sheet surfaces through the listed points.

2. An article of manufacture according to claim 1, defining a turbine bucket forming part of a second stage of a turbine.

3. An article of manufacture according to claim 1 wherein said hollow core shape lies in an envelope within +/−0.042 inches in a direction normal to any hollow core surface location.

4. An article of manufacture according to claim 1, wherein the X, Y and Z distances are scalable as a function of the same constant or number to provide a scaled-up or scaled-down bucket tip shroud.

5. An article of manufacture including a bucket airfoil having a hollow tip shroud, said hollow tip shroud having a hollow core having a nominal profile substantially in accordance with Cartesian coordinate values of X, Y and Z set forth in Table I, in a Cartesian coordinate system having its origin at a point A located 39.600 inches above the cold rotor center line at an intersection of the airfoil mean camber line and the leading-edge airfoil surface, its positive X axis defined by point A and a point B located 39.600 inches above the cold rotor center line at an intersection of the airfoil mean camber line and the trailing-edge airfoil surface, its positive X-Z plane defined by points A, B, and a point C located 49.862 inches above the cold rotor center line at an intersection of the airfoil mean camber line and the airfoil trailing-edge surface, and its Y axis defined using right-hand rule methodology, and wherein X, Y and Z are distances in inches, wherein the shape of the core is defined by the cloud of points listed which are distributed around each surface of the shroud, and the complete hollow portion of the tip shroud could be constructed by defining smooth sheet surfaces through the listed points.

6. An article of manufacture according to claim 5, defining a turbine bucket forming part of a second stage of a turbine.

7. An article of manufacture according to claim 5, wherein said hollow core shape lies in an envelope within +/−0.042 inches in a direction normal to any hollow core surface location.

8. An article of manufacture according to claim 5, wherein the X, Y and Z distances are scalable as a function of the same constant or number to provide a scaled-up or scaled-down bucket tip shroud.

9. An article of manufacture comprising a turbine wheel having a plurality of buckets, each of said buckets including an airfoil and a hollow tip shroud, said hollow tip shroud having a hollow core having a nominal profile substantially in accordance with Cartesian coordinate values of X, Y and Z set forth in Table I, in inches, wherein the shape of the core is defined by the cloud of points listed which are distributed around each surface of the shroud, and the complete hollow portion of the tip shroud could be constructed by defining smooth sheet surfaces through the listed points.

10. An article of manufacture according to claim 9, defining a gas turbine and wherein the turbine wheel comprises a second stage of the turbine.

11. An article of manufacture according to claim 9, wherein said Cartesian coordinate values of X, Y and Z set forth in Table I are in a Cartesian coordinate system having its origin at a point A located 39.600 inches above the cold rotor center line at an intersection of the airfoil mean camber line and the leading-edge airfoil surface, its positive X axis defined by point A and a point B located 39.600 inches above the cold rotor center line at an intersection of the airfoil mean camber line and the trailing-edge airfoil surface, its positive X-Z plane defined by points A, B, and a point C located 49.862 inches above the cold rotor center line at an intersection of the airfoil mean camber line and the airfoil trailing-edge surface, and its Y axis defined using right-hand rule methodology.

12. An article of manufacture according to claim 9, wherein the X, Y and Z distances are scalable as a function of the same constant or number to provide a scaled-up or scaled-down bucket tip shroud.

13. An article of manufacture according to claim 12, wherein the turbine wheel comprises a second stage of the turbine.

14. An article of manufacture according to claim 12, wherein said Cartesian coordinate values of X, Y and Z set forth in Table I are in a Cartesian coordinate system having its origin at a point A located 39.600 inches above the cold rotor center line at an intersection of the airfoil mean camber line and the leading-edge airfoil surface, its positive X axis defined by point A and a point B located 39.600 inches above the cold rotor center line at an intersection of the airfoil mean camber line and the trailing-edge airfoil surface, its positive X-Z plane defined by points A, B, and a point C located 49.862 inches above the cold rotor center line at an intersection of the airfoil mean camber line and the airfoil trailing-edge surface, and its Y axis defined using right-hand rule methodology.

15. An article of manufacture according to claim 12, said hollow core shape lying in an envelope within +/−0.042 inches in a direction normal to any hollow core surface location.

* * * * *